US 8,295,973 B2

(12) United States Patent
Finkler et al.

(10) Patent No.: US 8,295,973 B2
(45) Date of Patent: Oct. 23, 2012

(54) CONTROL ARRANGEMENT WITH CORRECTION MEANS FOR SYSTEMATIC POSITION-DEPENDENT ERRORS

(75) Inventors: Roland Finkler, Erlangen (DE); Hans-Georg Köpken, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 377 days.

(21) Appl. No.: 12/595,989

(22) PCT Filed: Apr. 14, 2008

(86) PCT No.: PCT/EP2008/054493
§ 371 (c)(1),
(2), (4) Date: Oct. 15, 2009

(87) PCT Pub. No.: WO2008/128918
PCT Pub. Date: Oct. 30, 2008

(65) Prior Publication Data
US 2010/0121467 A1 May 13, 2010

(30) Foreign Application Priority Data

Apr. 20, 2007 (DE) .......................... 10 2007 018 808

(51) Int. Cl.
*G06F 19/00* (2011.01)
(52) U.S. Cl. ....................................... 700/186; 318/638
(58) Field of Classification Search ................... 700/33, 700/56, 186, 188, 193; 318/638, 652
See application file for complete search history.

(56) References Cited

U.S. PATENT DOCUMENTS

| 4,999,558 A | * | 3/1991 | Onodera et al. | 318/685 |
| 6,664,752 B2 | * | 12/2003 | Kanayama et al. | 318/639 |
| 6,829,557 B2 | * | 12/2004 | Hausschmid et al. | 702/150 |
| 7,576,506 B2 | * | 8/2009 | Kleinau et al. | 318/471 |
| 2001/0054876 A1 | * | 12/2001 | Fujita et al. | 318/600 |

FOREIGN PATENT DOCUMENTS

| DE | 38 82 496 12 | 11/1993 |
| DE | 198 09 739 A1 | 9/1999 |
| DE | 102 06 747 A1 | 10/2002 |
| DE | 102 17 020 A1 | 11/2003 |
| GB | 2 374 683 A | 10/2002 |
| WO | WO 01/53981 A1 | 7/2001 |

* cited by examiner

*Primary Examiner* — John R. Cottingham
*Assistant Examiner* — Chad Rapp (57) ABSTRACT

A control arrangement for an electric drive with a control which processes desired values and actual values of the electric drive in relation to a desired-actual control is provided. A determination device determines a derived variable in an iterative manner in accordance with the actual values and the derived variable is fed to an evaluation device. The evaluation device associates the derived variables with position values of the drive and determines, after accumulating several derived variables, characteristic values of a systematic error in the desired values and/or the actual values. In accordance with the determined characteristic values, the evaluation device determines correction values and switches the correction values to the desired values, the actual values or the difference of desired and actual values.

20 Claims, 5 Drawing Sheets

CONTROL ARRANGEMENT WITH CORRECTION MEANS FOR SYSTEMATIC POSITION-DEPENDENT ERRORS

CROSS REFERENCE TO RELATED APPLICATIONS

This application is the US National Stage of International Application No. PCT/EP2008/054493 filed Apr. 14, 2008, and claims the benefit thereof. The International Application claims the benefits of German Application No. 10 2007 018 808.2 DE filed Apr. 20, 2007, both of the applications are incorporated by reference herein in their entirety.

FIELD OF INVENTION

The present invention relates to a control arrangement for an electrical drive, with the control arrangement comprising a control by which, during operation of the control arrangement, desired values and actual values are processed within the framework of a desired-actual control.

BACKGROUND OF INVENTION

These types of control arrangement are generally known. The usual position, velocity and electrical power controls of drives in particular have this structure and method of operation.

Figure 1:
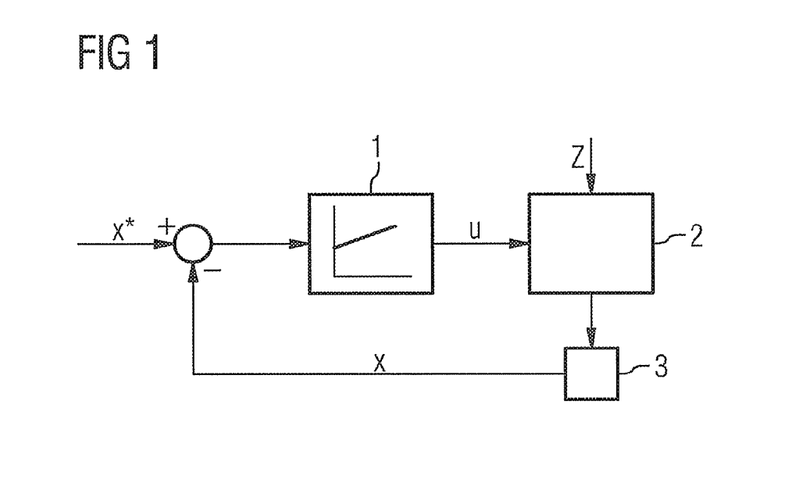
FIG. 1 a schematic diagram of a prior art control arrangement.

Control arrangements usually operate as depicted in FIG. 1 in accordance with the principle of a desired variable x* which is used for the control of a control path 2 being fed to the control 1. The corresponding actual value x of the control path 2 is detected by means of an encoder and likewise fed to the control 1. Based on the desired value x* and the actual value x—as a rule on the basis of the difference between desired value x* and actual value x—the control 1 determines a manipulated variable u for the control path 2 and regulates the control path 2 in this way to the required desired value x*.

In practice the control arrangement does not operate in the optimum way. In particular interference variables z often effect the control path 2, so that the actual value x does not correspond to the desired value x* despite ideal control. Furthermore in many cases the detection of actual values is (slightly) prone to errors, meaning that the actual value x delivered by the encoder 3 does not correspond exactly to the real actual value of the control path 2. The detection of such deviations of the actual value x supplied by the encoder 3 from the current actual value and the correction of these deviations is a first object of the present invention.

Nested control arrangements are often also used for drives. An example of such a control arrangement is shown in FIG. 2.

Figure 2:
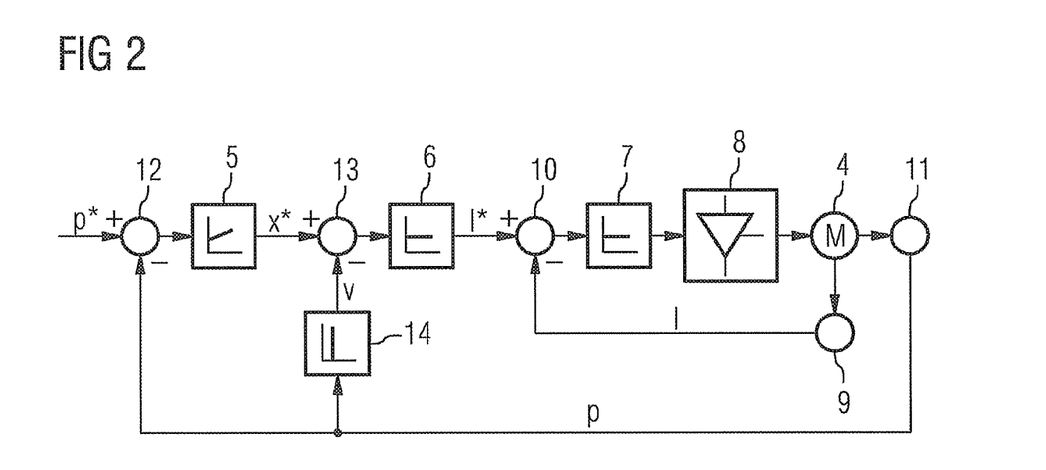
FIG. 2 a schematic diagram of a further prior art control arrangement.

In accordance with FIG. 2 a control arrangement for a drive features a position control 4, a velocity control 6 subordinate to the position control 5 and a power control 7 subordinate to the velocity control 6. The velocity control 6 can alternately operate as a "true" velocity control or a rotational speed control. The output signal of the power control 7 acts via a power regulator 8 on the drive 4. The actual current I is detected by means of a current sensor 9 and fed to a node point 10 in which the difference between the desired current I* and the actual current I is formed. An actual position value p is detected by means of a position sensor 11 and fed to a further node point 12, in which the difference between desired position value p* and actual position value p is formed.

The output signal of the position control 5 corresponds to a desired velocity value v*. An actual velocity value v is subtracted in a third node point 13 from the desired velocity value v*. The actual velocity value v is generally determined in a differentiator 14 based on the actual position value p.

The control arrangement depicted in FIG. 2 is normally operated with a clock, meaning that it repeats the execution of its control algorithm with a working clock T of for example 125 μs (corresponds to a clock frequency of 8 kHz).

With nested control arrangements in particular (see FIG. 2 for example) it can occur that although the actual value p of the outer control circuit (i.e. the actual position value p according to the example) may be in error, the error does not however disturb the control of the outer control circuit.

However the error in the actual value p of the outer control circuit can cause an error in the desired value v* of the subordinate control circuit, which has a disruptive effect.

The detection of these types of errors and their correction is a further object of the present invention.

A control arrangement for a drive is known from DE 102 06 747 A1, with the control arrangement featuring a control by which required values and actual values of the drive are processed during the operation of the control arrangement within the framework of a desired-actual control, with the control arrangement featuring a determination device, by which a respective derived value is determined iteratively during operation of the control arrangement and the derived value is assigned to an evaluation device, with the evaluation device, during operation of the control arrangement, assigning the respective derived variable to a position value of the drive and after accumulation of a sufficiently large number of derived variables, determining characteristic values of a systematic error contained in the actual values, with the evaluation device during operation of the control arrangement, determining correction values depending on the determined characteristic values and applying the correction values to the actual values.

The derived variable is derived in DE 102 06 747 A1 on the basis of the respective actual position value and a further actual position value. A transmission is arranged between the two position sensors which detect the two actual position values.

A control arrangement for an electrical drive is known from DE 198 09 739 A1, with the control arrangement featuring a control by which, during operation of the control arrangement, required values and actual values of the drive are processed within the framework of a required-actual control, with the control arrangement featuring a determination device by which a respective derived variable is determined iteratively during the operation of the control arrangement and the derived variable is assigned to an evaluation device, with the evaluation device, during operation of the control arrangement, assigning the derived variable to a position value of the drive in each case and after accumulation of a sufficiently large number of derived variables, determining characteristic values of a systematic error contained in the actual values, with the evaluation device, during operation of the control arrangement, determining correction values depending on the characteristic values determined and applying the correction values to the actual values, with the derived value determined by the determination device being the speed-related speed ripple.

A control arrangement for an electrical drive is known from DE 102 17 020 A1, with the control arrangement featuring a control by which, during operation of the control arrangement, required values and actual values of the drive are processed within the framework of a required-actual control, with the control arrangement featuring a determination device, by which during operation of the control arrangement a respective derived value is determined iteratively and the derived variable is assigned to an evaluation device, with the evaluation device, during operation of the control arrangement, assigning the derived value in each case to a position value of the drive and, after accumulation of a sufficiently large number of derived variables, determining characteristic values of a systematic error contained in the actual values, with the evaluation device, during operation of the control arrangement, determining correction values depending on the determined characteristic values and applying the correction values to the actual values, with the variable determined by the determination device depending on the difference between the actual value and the required value.

SUMMARY OF INVENTION

An object of the present invention consists of creating a control arrangement for an electrical drive, by means of which a systematic error contained in the actual values can be detected and corrected in an efficient manner.

The object is achieved by a control arrangement as claimed in the claims.

Inventively the control arrangement features a determination device by which, during operation of the control arrangement, a respective derived value is determined iteratively and the derived value is fed to an evaluation device. During operation of the control arrangement, the evaluation device assigns the derived variable in each case to a position value of the drive. After accumulation of a sufficiently large number of derived variables, the evaluation device determines characteristic values of a systematic error contained in the actual values. Furthermore, the evaluation device, during operation of the control arrangement, determines correction values as a function of the characteristic values determined and apples the correction values to the desired values, the actual values, or the difference between desired and actual values. The derived variable determined by the determination device depends on the difference in the temporal derivation of the actual value of the actual value of an underlying desired value determined by the control on the basis of the actual value and the required value, with the difference being divided by a velocity with which the position values change.

The inventive control arrangement can always be used when systematic errors are present. It is especially able to be used independently of whether the systematic error—seen over the position of the drive—recurs at regular intervals (i.e. periodically) or not. In many cases however the systematic error, at least in a part section of the area of movement of the drive (often even in the entire area of movement of the drive), is at least approximately periodic with the position of the drive. In this case the characteristic values can be spectral coefficients which are related to a predetermined spatial period of the drive uniform for all spectral coefficients.

It is possible for the control arrangement to be embodied such that, during the operation of the control arrangement, it keeps a velocity at which the position values of the drive change at least approximately constant during the collection of the sufficiently large number of derived variables. In this case the evaluation device can determine the spectral coefficients by spectral analysis over time of the derived variables.

Alternatively it is possible for the evaluation device to determine the spectral coefficients through a location-related spectral analysis of the derived variables. This method of operation can be realized independently of whether the velocity at which the position values of the drive change is kept constant or not.

In a preferred embodiment of the present invention the evaluation device sorts the derived variables into slots related to the spatial period and determines the spectral coefficients when at least one derived variable is sorted into a sufficiently large number of the slots in each case. This method of operation allows the spectral coefficients to be determined relatively easily.

In principle it is possible for the evaluation device to include the last derived variable sorted into the respective slot in each case for determining the spectral coefficients per slot. As a rule however better results are produced if the evaluation device determines for each slot the average value of the derived variables sorted into the respective slot and determines the spectral coefficients on the basis of the average values.

Better results are produced if the derived variable is only determined by the determination device when the am of the velocity exceeds a minimum value.

The inventive method leads to good results if disruptive forces occurring are not correlated with the systematic error. In the event such a correlation existing, the systematic error can still be determined however. It is necessary for this for the evaluation device to assign the derived variables as a function of at least one of the further variables differing from the position values of the drive to one of a number of measurement series, to determine on the basis of the derived variables at least one of the measurement series and to determine the characteristic values based on the preliminary coefficients of at least two of the measurement series. The further values can for example be the velocity with which the position values change.

Preferably the evaluation device applies the correction values with time lowpass filtering to the actual values, the desired values or the difference of desired and actual values. This method of operation leads to a softer control behavior of the control.

The control arrangement can feature a position sensor, from which during operation of the control arrangement, at the same time as the actual values are determined, an actual position value of the drive is detected in each case and supplied to the evaluation device as the position value. This method of operation leads to especially good results.

BRIEF DESCRIPTION OF THE DRAWINGS

Further advantages and details emerge from the subsequent description of exemplary embodiments in conjunction with the drawings. The figures show the following basic diagrams.

DETAILED DESCRIPTION OF INVENTION

Figure 3:
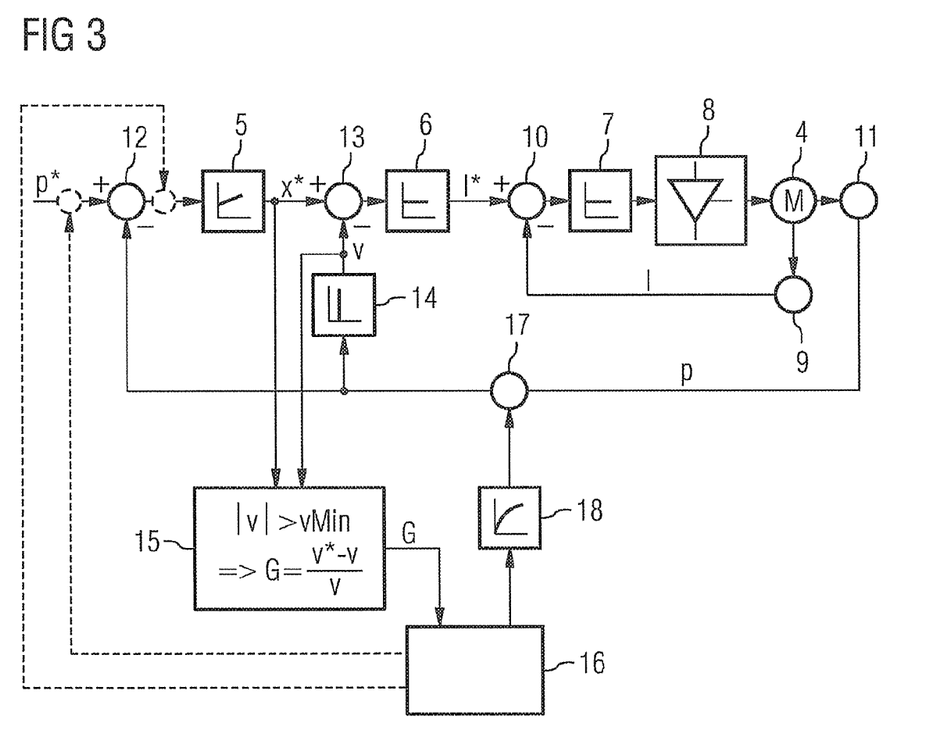
FIG. 3 an inventive control arrangement.

The present invention will be explained below in greater detail in conjunction with a control arrangement as depicted in FIG. 3.

The control arrangement of FIG. 3 builds on the control arrangement of FIG. 2. However the invention can also be used with other control arrangements.

In addition to the elements 4 through 14 described above in connection with FIG. 2, the control arrangement from FIG. 3 features a determination device 15, an evaluation device 16 and an application block 17. Optionally it can also contain a lowpass filter 18 (or a device that acts in the same way).

The application block 17 is arranged in accordance with FIG. 3 such that correction values determined by the evaluation device 16 will be applied to the actual position value p. As indicated by dashed lines in FIG. 3, the correction values can however alternatively be applied to the desired position values p" or to the difference between the desired position values and the actual position values p.

The control arrangement of FIG. 3—like the control arrangement of FIG. 2—generally operates with a fixed operating clock T of 125 μs for example. Where the detection and processing of actual values p, v, I and of the corresponding desired values p*, v*, I* is discussed below, these detections and processing are undertaken iteratively with the operating clock T.

According to FIG. 3, from each of the controls 5 to 7 of the control arrangement, desired and actual values p*, v*, I*, p, v, I of the drive 4—for example from position control 5 the desired position values p* and the actual position values p—are processed within the framework of a desired-actual control. Furthermore a derived variable G is determined in each case by the determination device 15 with the working clock T. In accordance with the exemplary embodiment the difference between desired velocity value v* and actual velocity value, divided by a velocity, is included as the derived variable G The desired velocity value v* is determined in this case by the position control 5 on the basis of the desired position value p* and the actual position value p. The actual velocity value v is determined by temporal derivation of the actual position value p in the differentiator 14.

In accordance with the exemplary embodiment the derived variable G is determined according to the formula $$G = \frac{v^* - v}{v}. \quad (1)$$

The derivation of the derived variable G is suppressed however if the amount of the actual velocity value v is too small, i.e. lies below a minimum value vMin. It should additionally be mentioned in this context that the desired velocity value v* could also be in the denominator of formula I instead of the actual velocity value v.

The determination device 15 supplies the variable G determined by it to the evaluation device 16. In accordance with FIG. 4, the evaluation device 16 accepts the derived variable G and the corresponding actual position value p in a step S1. As an alternative to the actual position value p, the evaluation device 16 can also accept the desired position value p*. The term "position value" is thus used below since, depending on the application case, the position value can involve the alternatives of actual value p or desired value p*.

Figure 4:
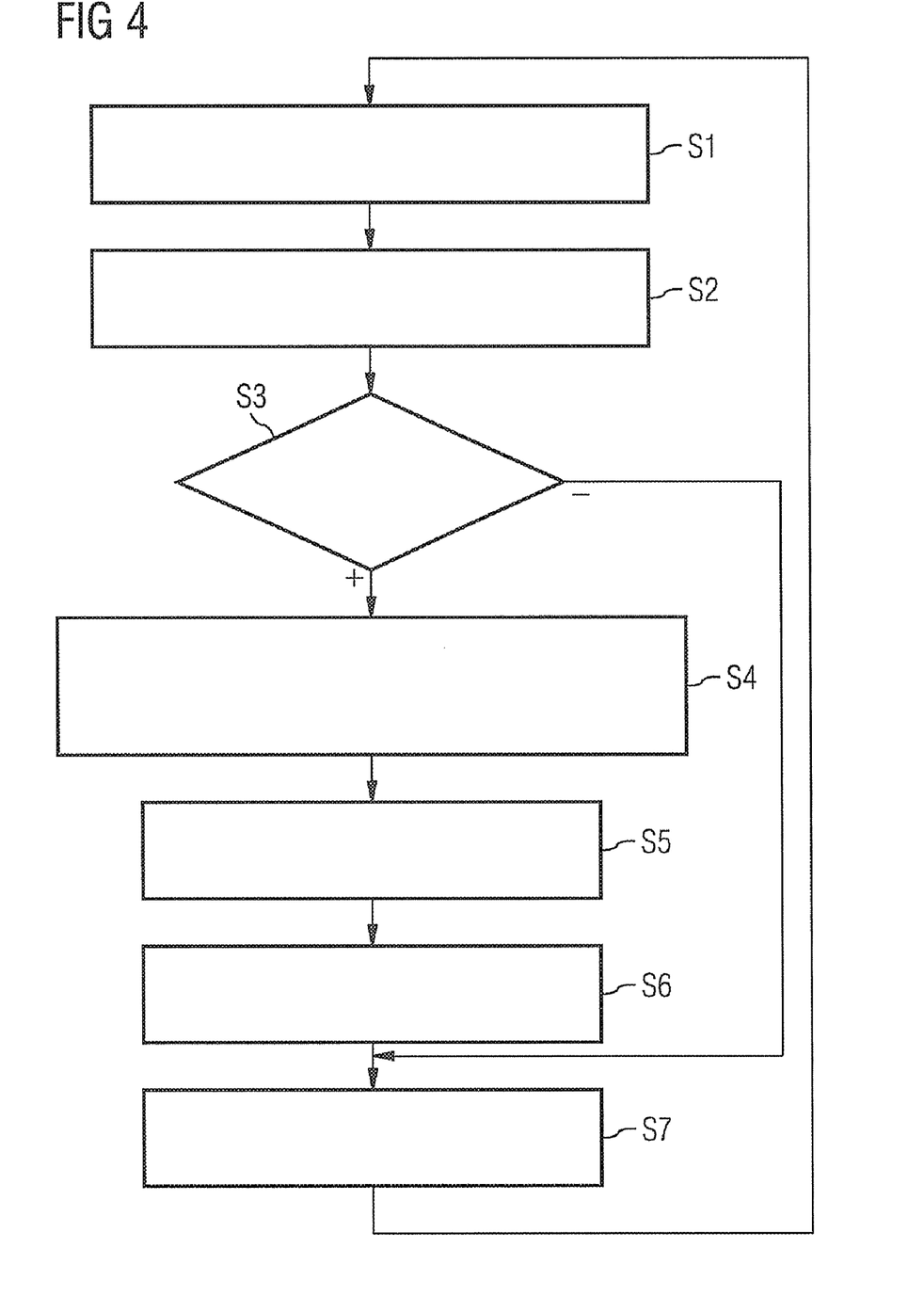
FIGS. 4 to 6 flow diagrams.

In a step S2 the evaluation device 16 assigns the derived variable to the position value p and stores this pair of values. In a step S3 the evaluation device 16 checks whether it has already collected a sufficiently large number of derived variables G. If the result of the test in step S3 is positive, in a step S4 the evaluation device 16 determines on the basis of the derived variable G characteristic values of a systematic error which is contained in the actual values p and/or the desired values v*. Then, in a step S5, it deletes the previously collected derived variables G.

In a step S6 the evaluation device 16 determines correction values depending on the characteristic values. In a step S7, the evaluation device 16 applies the correction values to the actual values p. As already mentioned, the correction values can be applied alternately to the desired values p* or to the control deviation p*-p.

In the simplest case the evaluation device 16 determines the correction values within the framework of the step S6 exclusively on the basis of the characteristic values determined in step S4. Within the framework of step S7, in the simplest case the evaluation device 16 also applies the correction values immediately completely to the actual values p. Preferably however an at least single, where possible double-damped application is undertaken.

On the one hand not only the newly determined characteristic values are included in the correction values but also the previous correction values. In particular the new correction values can be determined as part of step S6 for example in accordance with one of the relationships $$\text{Korr-neu} = \alpha \cdot \text{Kenn} + \text{Korr-alt} \quad (2a)$$

and $$\text{Korr-neu} = \alpha \cdot \text{Kenn} + (1-\alpha) \cdot \text{alt}. \quad (2b)$$

α in this case is a factor lying between zero and one. The German terms Korr-neu, Kenn and Korr-alt are translated into English as correction-new, characteristic and correction-old. For the sake of completeness it is also pointed out that the correction values will be set before the first determination of the characteristic values to default values (as a rule zero).

On the other hand the lowpass filter 18 already mentioned can be arranged between the evaluation device 16 and the application block 17. The lowpass filter results in the new correction values not abruptly replacing the previous correction values but in the correction value change being blurred over time. Another effect is that the evaluation device 16 applies the correction values lowpass filtered over time to the actual values p.

In many cases the systematic error occurring—at least in a subarea of the movement path of drive 4, often even over the entire movement path of drive 4—is periodic with the position p of the drive 4 or at least approximately periodic. In particular systematic errors can occur with drives 4 that act rotationally that are periodic with the revolutions. In such cases the characteristic values can be spectral coefficients that are related to a spatial period X of the drive 4 (for example one revolution). The spatial period X in this case is predetermined and uniform for all spectral coefficients.

It is possible for the control arrangement to be able to be driven such that the actual velocity v of the drive 4 is kept (at least approximately) constant for a sufficiently long time. The term "sufficiently long" in this case means a period extending over a number of spatial periods X (for example 5, 8 or 10 spatial periods X). During this period a sufficiently large number of derived variables G is detected and stored. Because of the fact that the actual velocity v is kept constant, position p and time t correspond linearly to each other however. It is thus possible for the evaluation device 16 to determine the spectral coefficients by a usual spectral analysis of the derived variables G generally known per se. The spectral coefficients merely have to be converted to the location after being determined.

As an alternative to a temporal spectral analysis it is always possible however for the evaluation device 16 to perform a location-related spectral analysis of the derived variables G and to determine the spectral coefficients in this way. The latter procedure is described in greater detail below in conjunction with FIG. 5 which shows a possible configuration of steps S1 through S4 of FIG. 4.

Figure 5:
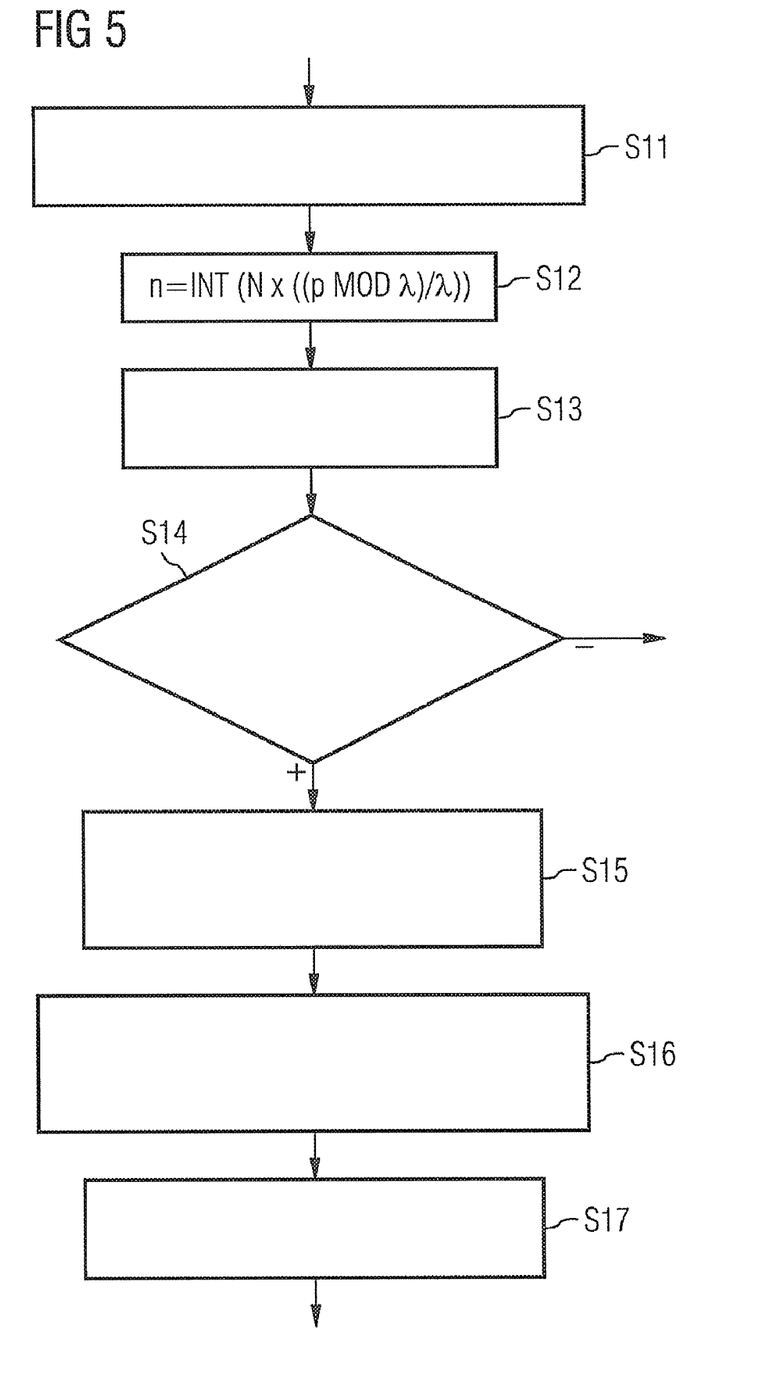

According to FIG. 5 the evaluation device accepts a derived variable G and a corresponding position value p in a step S11. Step S11 corresponds to step S1 of FIG. 4.

In a step S12 the evaluation device 16 determines a number n. The number n defines into which of a number of (=N) slots the derived variable G is to be sorted. Because of the type of definition of the number n in step S12 the slots are related to the spatial period X here. In step S13 the evaluation device 16 sorts the derived variable G into the slot defined in step S12. Steps S12 and S13 together correspond to an embodiment of step S2 of FIG. 4.

In a step S14 the evaluation device 16 checks whether there is at least one derived variable G in sufficiently many of the slots in each case. For example the evaluation device 16 can check whether at least one derived variable G has been sorted into at least 75% of the slots and whether each slot into which no derived variable G is sorted is delimited on both sides by slots into which at least one derived variable G is sorted in each case. Step S14 corresponds to an embodiment of step S3 of FIG. 4.

In a step S15 the evaluation device 16 determines for each occupied slot the average of the derived variables G sorted into the respective slot. In a step S16 the evaluation device 16 likewise determines an average value for the unoccupied slots. The evaluation device 16 can especially determine these average values on the basis of average values of the immediately adjacent slots. In a step S17 the evaluation device 16 determines the spectral coefficients based on the average values. The steps S15 through S17 together correspond to a possible embodiment of step S4 of FIG. 4.

The method of operation described in FIGS. 1 through 5 above leads to very good results when the systematic errors and any interference variables are uncorrelated to each other. If on the other hand such a correlation exists, a more complex method of operation must be undertaken. The more complex method of operation will be explained below in greater detail in conjunction with FIG. 6.

Figure 6:
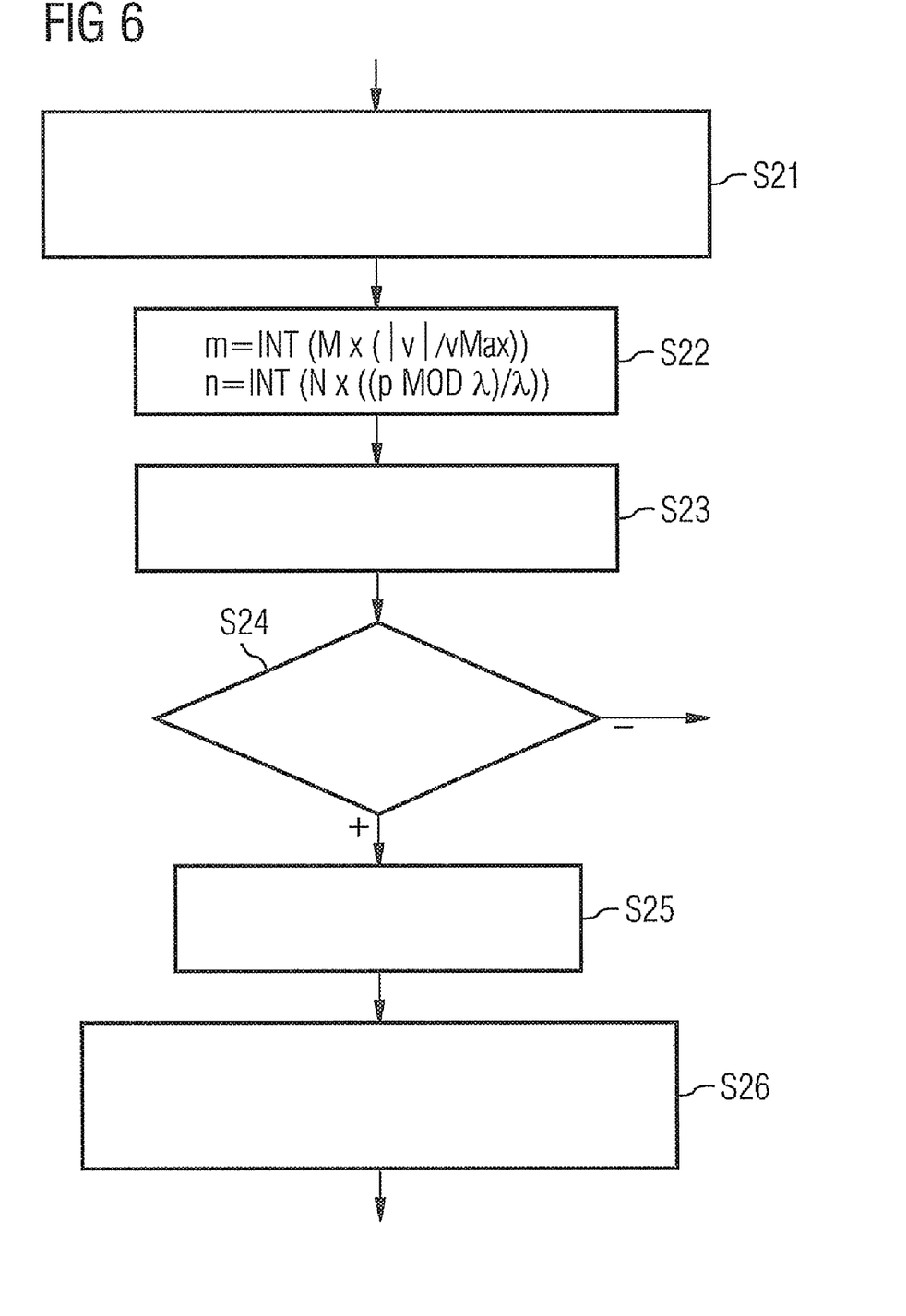

In accordance with FIG. 6 the evaluation device 16—in a similar way to steps S1 and S11—accepts the respective derived variable G and the position value p in a step S21. Furthermore it accepts a further value in step S21, for example the current actual velocity v.

In a step S22 the evaluation device 16 determines on the basis of the further value v one of a number (=M) of measurement series and within the respective measurement series in a similar way to step S12 one of a number of slots. vMax corresponds in this case to a maximum velocity occurring during operation. In step S23 the evaluation device 16 sorts the derived variable G as in step S13 into the selected slot of the selected measurement series.

In a step S24 the evaluation device 16 checks whether the slots of the measurement series are sufficiently filled. The step S24 essentially corresponds to a check similar to that performed in step S14, but separately for each measurement series.

In a step S25 the evaluation device 16 determines preliminary coefficients for each measurement series. Step S25 can for example—separately for each measurement series—correspond to an evaluation similar to that performed in steps S15 through S17 of FIG. 5. In a step S26 the evaluation device 16 finally determines on the basis of the preliminary coefficients of step S25 the spectral coefficients (or more generally the characteristic values) of the systematic error.

The method of operation of FIG. 6 is based on the approach that each measurement series delivers a sum value which on the one hand contains a systematic error and on the other a correlation-related error. When the regularity with which the correlation-related error depends on the further variable v is known, the individual errors can be separated on the basis of a number of sum values. This will be explained in greater detail below with reference to an example.

It is known that the sum value D can be written as $$F = F1 + F2 \tag{3}$$

with F1 being the systematic error and F2 the correlation-related error. It is further known that the systematic error is velocity-dependent and the correlation-related error is reciprocal to the velocity v. In this case the systematic error can be determined on the basis of (only) two measurement series to which different velocities v1, v2 are assigned. Since in this case the following applies $$F(v1) = F1 + F2(v1) \tag{4}$$

$$F(v2) = F1 + F2(v2) \tag{5}$$

and also $$v1 F2(v1) = v2 F2(v2) \tag{6}$$

Three unknowns occur in formulas 4 through 6, namely the systematic error F1, the correlation-related error F2 for the first velocity v1 and the correlation-related error F2 for the second velocity v2. By insertion and resolution the systematic error F1 for $$F1 = \frac{v2 F(v2) - v1 F(v1)}{v2 v1} \tag{7}$$

can thus be determined.

The present invention has many advantages. In particular it can be used depending on whether the error is measurement division-periodic, revolution-periodic, periodic in another way or not periodic. It merely has to be systematic.

The above description is used exclusively to explain the present invention. The scope of protection of the present invention on the other hand is to be determined by the enclosed claims.

The invention claimed is:

1. A control arrangement for an electrical drive, comprising:
   a control device processing desired values and actual values of the drive within a desired-actual control,
   a determination device determining a derived variable iteratively;
   an evaluation device receiving a position value comprising an actual position value or a desired position value, and receiving the derived variable from the determination device,
   the evaluation device assigning the derived variable to the position value of the drive and, after accumulating a sufficiently large number of derived variables, determining characteristic values of a systematic error contained in the actual values,
   the evaluation device determining correction values as a function of the characteristic values determined and applying the correction values to the desired position values, the actual position values or a difference between desired and actual position values,
wherein the derived variable determined by the determination device depends on a calculated difference in an actual velocity value determined by a temporal derivation of the actual position value from a desired velocity value determined by the control device divided by the actual velocity or the desired velocity.

2. The control arrangement as claimed in claim 1, wherein a systematic error at least in a part section of an area of movement of the drive is at least approximately periodic with the position of the drive and that the characteristic values are spectral coefficients which are related to a predetermined spatial period of the drive uniform for all spectral coefficients.

3. The control arrangement as claimed in claim 2, wherein the control arrangement is embodied such that, during operation of the control arrangement, a velocity with which the position values of the drive change is kept approximately constant during an accumulation of the sufficiently large number of derived variables, and that the evaluation device determines the spectral coefficients by using a temporal spectral analysis of the derived variables.

4. The control arrangement as claimed in claim 3, wherein the evaluation device sorts the derived variables into slots related to the spatial period, and wherein the evaluation device determines the spectral coefficients once at least one derived variable has been sorted into a sufficiently large number of slots.

5. The control arrangement as claimed in claim 4, wherein the evaluation device determines for each slot an average value of the derived variables sorted into the respective slot and determines the spectral coefficients based upon the average values.

6. The control arrangement as claimed in claim 3, wherein the derived variable is only determined by the determination device when an amount of the actual velocity value exceeds a minimum value.

7. The control arrangement as claimed in claim 3, further comprising:
a position sensor detecting the actual position value of the drive simultaneously to detecting the actual velocity values and supplying the actual position value to the evaluation device as position value.

8. The control arrangement as claimed in claim 2, wherein the evaluation device determines the spectral coefficients by a location-related spectral analysis of the derived variables.

9. The control arrangement as claimed in claim 8, wherein the evaluation device sorts the derived variables into slots related to the spatial period, and wherein the evaluation device determines the spectral coefficients once at least one derived variable has been sorted into a sufficiently large number of slots.

10. The control arrangement as claimed in claim 9, wherein the evaluation device determines for each slot an average value of the derived variables sorted into the respective slot and determines the spectral coefficients based upon the average values.

11. The control arrangement as claimed in claim 2, wherein the evaluation device sorts the derived variables into slots related to the spatial period, and wherein the evaluation device determines the spectral coefficients once at least one derived variable has been sorted into a sufficiently large number of slots.

12. The control arrangement as claimed in claim 11, wherein the evaluation device determines for each slot an average value of the derived variables sorted into the respective slot and determines the spectral coefficients based upon the average values.

13. The control arrangement as claimed in claim 2, wherein the derived variable is only determined by the determination device when an amount of the actual velocity value exceeds a minimum value.

14. The control arrangement as claimed in claim 2, wherein the evaluation device applies the correction values temporally lowpass filtered to the actual position values, the required position values or the difference between required and actual position values.

15. The control arrangement as claimed in claim 2, further comprising:
a position sensor detecting the actual position value of the drive simultaneously to detecting the actual velocity values and supplying the actual position value to the evaluation device as position value.

16. The control arrangement as claimed in claim 1, wherein the derived variable is only determined by the determination device when an amount of the actual velocity value exceeds a minimum value.

17. The control arrangement as claimed in claim 1, wherein
the evaluation device assigns the derived variables as a function of at least one further value different from the position values of the drive to one of a plurality of measurement series,
the evaluation device determines preliminary coefficients based upon the derived variables of one of the measurement series, and
the evaluation device determines the characteristic values based upon the preliminary coefficients of at least two of the measurement series.

18. The control arrangement as claimed in claim 17, wherein the further variable is a velocity at which the position values change.

19. The control arrangement as claimed in claim 1, wherein the evaluation device applies the correction values temporally lowpass filtered to the actual position values, the required position values or the difference between required and actual position values.

20. The control arrangement as claimed in claim 1, further comprising:
a position sensor detecting the actual position value of the drive simultaneously to detecting the actual velocity values and supplying the actual position value to the evaluation device as position value.

* * * * *